US012602217B2

(12) United States Patent
Suryanarayana et al.

(10) Patent No.: US 12,602,217 B2
(45) Date of Patent: Apr. 14, 2026

(54) SEAMLESS UPDATE PROVISIONING FOR COMMON CHIPSETS CARRYING DIFFERENT CPU FAMILIES

(71) Applicant: DELL PRODUCTS L.P., Round Rock, TX (US)

(72) Inventors: Shekar Babu Suryanarayana, Bangalore (IN); Anjali S, Kollemcode (IN); Karunakar Poosapalli, Hyderabad (IN)

(73) Assignee: DELL PRODUCTS L.P., Round Rock, TX (US)

( * ) Notice: Subject to any disclaimer, the term of this patent is extended or adjusted under 35 U.S.C. 154(b) by 86 days.

(21) Appl. No.: 17/970,167

(22) Filed: Oct. 20, 2022

(65) Prior Publication Data

US 2024/0134622 A1 Apr. 25, 2024
US 2024/0231790 A9 Jul. 11, 2024

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
CPC ..................................... G06F 8/65; G06F 8/71
See application file for complete search history.

(56) References Cited

U.S. PATENT DOCUMENTS

| | | | |
|---|---|---|---|
| 7,425,992 B2 * | 9/2008 | Feeler | H04N 21/4432 |
| | | | 348/553 |
| 7,849,454 B2 * | 12/2010 | Lambert | G06F 11/1417 |
| | | | 717/168 |
| 8,082,353 B2 | 12/2011 | Huber et al. | |
| 8,756,256 B2 | 6/2014 | Tugnawat et al. | |
| 9,940,330 B2 | 4/2018 | Le et al. | |
| 9,980,213 B2 | 5/2018 | Lynch et al. | |
| 10,346,848 B2 | 7/2019 | Ziat et al. | |
| 10,642,623 B1 * | 5/2020 | Righi | G06F 8/65 |
| 10,861,090 B2 | 12/2020 | Haggerty et al. | |
| 10,897,373 B2 * | 1/2021 | Ansari | G06F 16/64 |
| 10,936,299 B2 * | 3/2021 | Butcher | G06F 8/654 |
| 11,120,442 B2 | 9/2021 | Hurley et al. | |
| 11,347,858 B2 * | 5/2022 | Gopal | H04L 9/0897 |
| 11,488,136 B2 | 11/2022 | Sharp et al. | |

(Continued)

*Primary Examiner* — Lewis A Bullock, Jr.
*Assistant Examiner* — Theodore E Hebert
(74) *Attorney, Agent, or Firm* — Jackson Walker LLP; Christopher J. Rourk

(57) ABSTRACT

A system for network management comprising a silicon management system operating on a processor that causes the processor to load one or more algorithms stored in a non-transient data memory to cause the processor to identify a version for a plurality of silicon data processing devices and to implement an update to one or more of the silicon data processing devices, a chipset management system operating on a processor that causes the processor to load one or more algorithms stored in a non-transient data memory to cause the processor to identify a version for a plurality of chipsets, each chipset associated with one of the silicon data processing devices and to implement an update to one or more of the chipsets and a boot system configured to cause a system associated with the updated silicon data processing devices and the updated chipsets to reboot.

20 Claims, 8 Drawing Sheets

(56)           References Cited

U.S. PATENT DOCUMENTS

| | | | |
|---|---|---|---|
| 2003/0066062 A1* | 4/2003 | Brannock | G06F 8/654 |
| | | | 717/169 |
| 2005/0021968 A1* | 1/2005 | Zimmer | G06F 21/572 |
| | | | 713/176 |
| 2006/0015861 A1* | 1/2006 | Takata | G06F 8/656 |
| | | | 717/162 |
| 2011/0179407 A1* | 7/2011 | Minegishi | G06F 8/65 |
| | | | 717/170 |
| 2014/0007073 A1* | 1/2014 | Cavalaris | G06F 8/63 |
| | | | 717/172 |
| 2014/0040605 A1* | 2/2014 | Futral | G06F 9/445 |
| | | | 713/2 |
| 2015/0370653 A1* | 12/2015 | Scott | G06F 9/4411 |
| | | | 714/19 |
| 2015/0379306 A1* | 12/2015 | Zimmer | G09C 1/00 |
| | | | 713/193 |
| 2016/0232010 A1* | 8/2016 | Dicks | G16H 40/67 |
| 2016/0330175 A1* | 11/2016 | Li | G06F 8/65 |
| 2017/0003956 A1* | 1/2017 | Chang | G06F 8/658 |
| 2017/0010899 A1* | 1/2017 | Dasar | G06F 8/654 |
| 2017/0109235 A1* | 4/2017 | Hung | G06F 11/1451 |
| 2017/0131991 A1* | 5/2017 | Su | G06F 8/66 |
| 2017/0257886 A1 | 9/2017 | Adjakple et al. | |
| 2017/0286086 A1* | 10/2017 | Narasimhan | G06F 8/654 |
| 2019/0171436 A1* | 6/2019 | Shivanna | G06F 8/65 |
| 2019/0243631 A1* | 8/2019 | Sharma | G06F 21/572 |

* cited by examiner

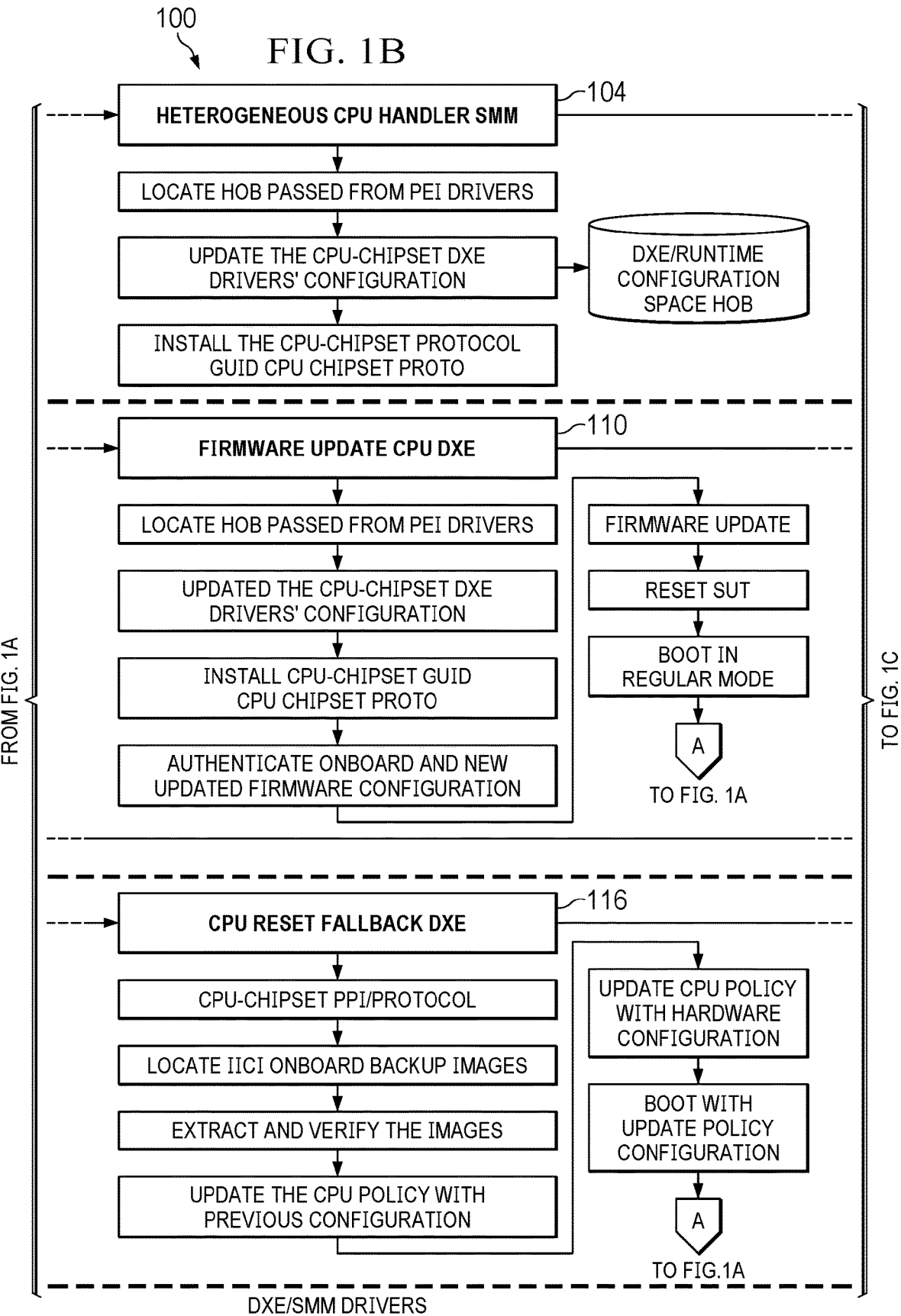

HETEROGENEOUS CPU HANDLER SMM ⟋104

LOCATE HOB PASSED FROM PEI DRIVERS

UPDATE THE CPU-CHIPSET DXE DRIVERS' CONFIGURATION → DXE/RUNTIME CONFIGURATION SPACE HOB

INSTALL THE CPU-CHIPSET PROTOCOL GUID CPU CHIPSET PROTO

FIRMWARE UPDATE CPU DXE ⟋110

LOCATE HOB PASSED FROM PEI DRIVERS

UPDATED THE CPU-CHIPSET DXE DRIVERS' CONFIGURATION

INSTALL CPU-CHIPSET GUID CPU CHIPSET PROTO

AUTHENTICATE ONBOARD AND NEW UPDATED FIRMWARE CONFIGURATION

FIRMWARE UPDATE

RESET SUT

BOOT IN REGULAR MODE

CPU RESET FALLBACK DXE ⟋116

CPU-CHIPSET PPI/PROTOCOL

LOCATE IICI ONBOARD BACKUP IMAGES

EXTRACT AND VERIFY THE IMAGES

UPDATE THE CPU POLICY WITH PREVIOUS CONFIGURATION

UPDATE CPU POLICY WITH HARDWARE CONFIGURATION

BOOT WITH UPDATE POLICY CONFIGURATION

FROM FIG. 1A

TO FIG. 1C

DXE/SMM DRIVERS

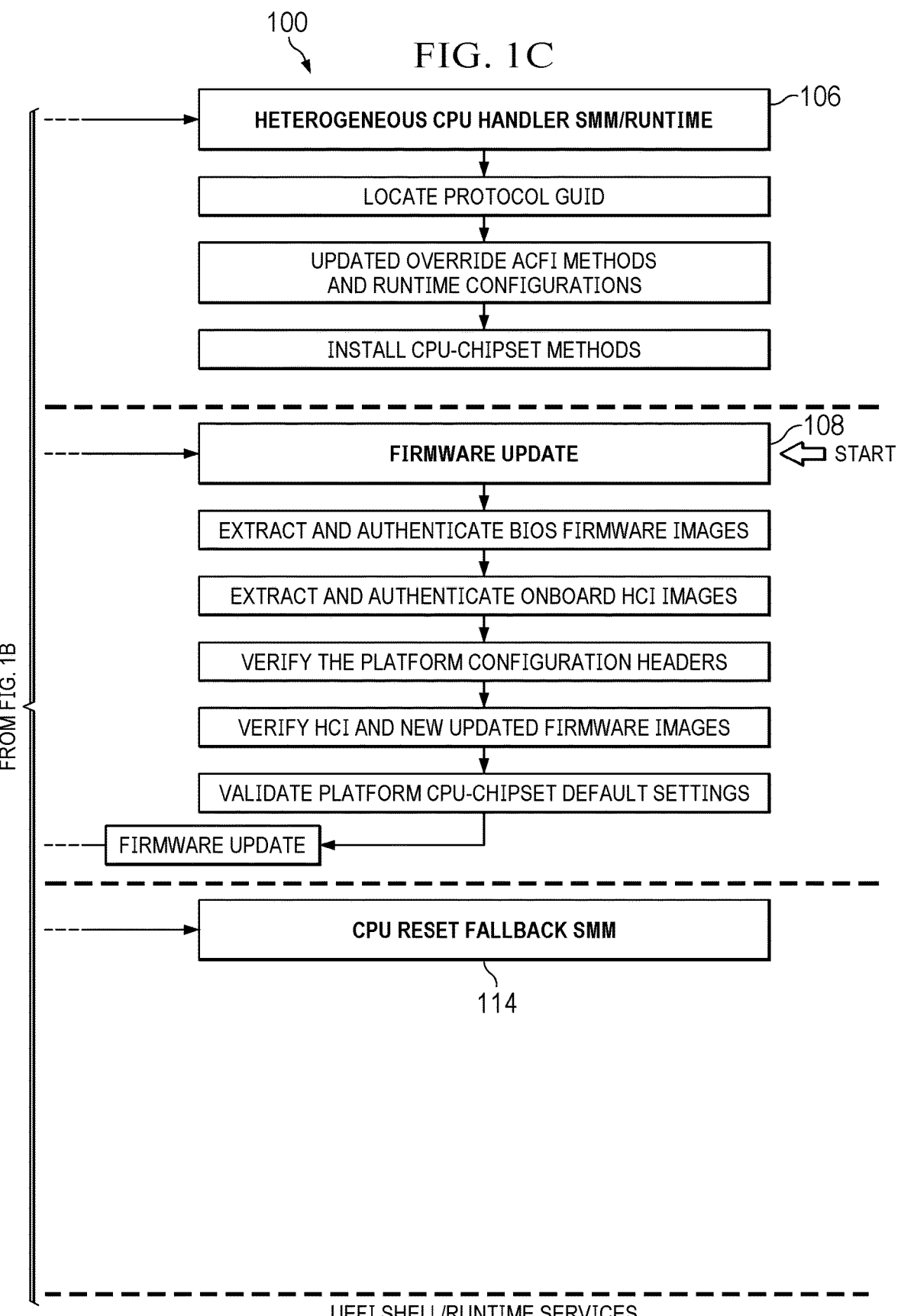

HETEROGENEOUS CPU HANDLER SMM/RUNTIME — 106

LOCATE PROTOCOL GUID

UPDATED OVERRIDE ACFI METHODS
AND RUNTIME CONFIGURATIONS

INSTALL CPU-CHIPSET METHODS

FIRMWARE UPDATE — 108 ⇐ START

EXTRACT AND AUTHENTICATE BIOS FIRMWARE IMAGES

EXTRACT AND AUTHENTICATE ONBOARD HCI IMAGES

VERIFY THE PLATFORM CONFIGURATION HEADERS

VERIFY HCI AND NEW UPDATED FIRMWARE IMAGES

VALIDATE PLATFORM CPU-CHIPSET DEFAULT SETTINGS

FIRMWARE UPDATE

FROM FIG. 1B

CPU RESET FALLBACK SMM

114

UEFI SHELL/RUNTIME SERVICES

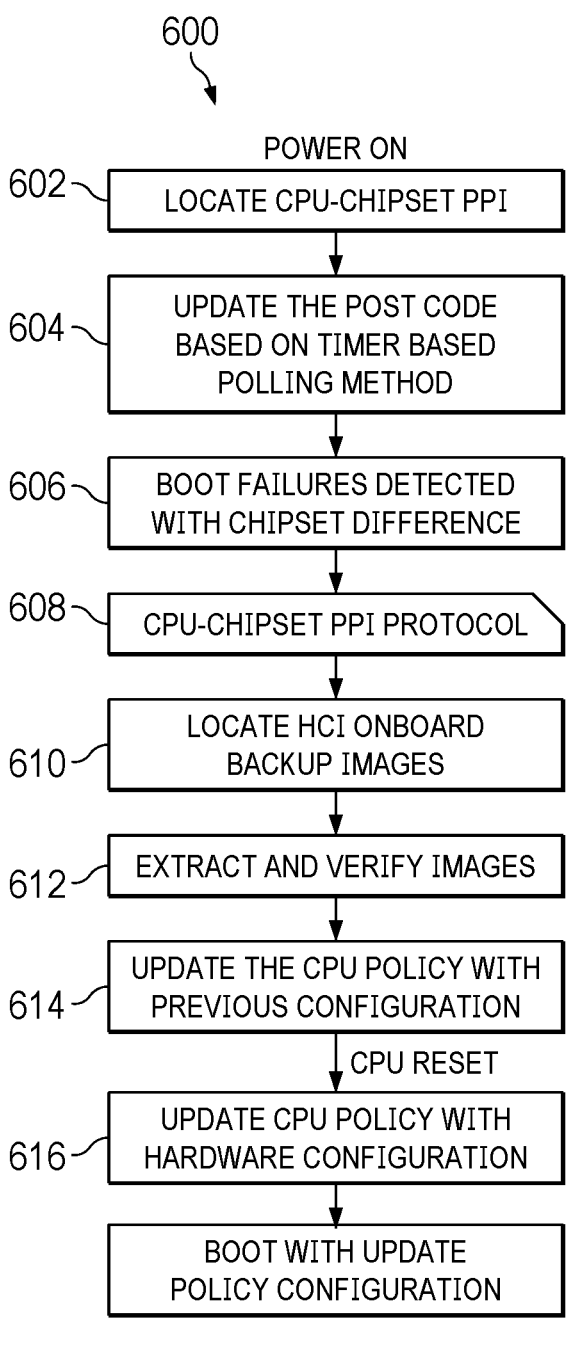

600

POWER ON

602 — LOCATE CPU-CHIPSET PPI

604 — UPDATE THE POST CODE BASED ON TIMER BASED POLLING METHOD

606 — BOOT FAILURES DETECTED WITH CHIPSET DIFFERENCE

608 — CPU-CHIPSET PPI PROTOCOL

610 — LOCATE HCI ONBOARD BACKUP IMAGES

612 — EXTRACT AND VERIFY IMAGES

614 — UPDATE THE CPU POLICY WITH PREVIOUS CONFIGURATION

CPU RESET

616 — UPDATE CPU POLICY WITH HARDWARE CONFIGURATION

BOOT WITH UPDATE POLICY CONFIGURATION

FIG. 6

SEAMLESS UPDATE PROVISIONING FOR COMMON CHIPSETS CARRYING DIFFERENT CPU FAMILIES

TECHNICAL FIELD

The present disclosure relates generally to data processing, and more specifically to systems and methods for seamless update provisioning for common chipsets carrying different CPU families.

BACKGROUND OF THE INVENTION

Enterprise networks can contain a large number of different processors, where some of the processors are newer than others. If an original equipment manufacturer (OEM) issues an update for the code associated with one version of the processors, it needs to be conformed to all other processors to ensure seamless operation between processors, but there is no effective way to accomplish that objective.

SUMMARY OF THE INVENTION

A system for network management is disclosed that includes a silicon management that can identify a version for a plurality of CPUs and implement an update to one or more of the CPUs. A chipset management system can identify a version for a plurality of chipsets, where each chipset is associated with one of the CPUs, and can implement an update to one or more of the chipsets. A boot system is configured to cause a system associated with the updated silicon data processing devices and the updated chipsets to reboot.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which:

FIGS. 1A through 1C are a diagram of a system for seamless update provisioning for common chipsets carrying different CPU families, in accordance with an example embodiment of the present disclosure;

FIG. 6 is a diagram of an algorithm for CPU reset based fallback, in accordance with an example embodiment of the present disclosure.

DETAILED DESCRIPTION OF THE INVENTION

Figure 1A:
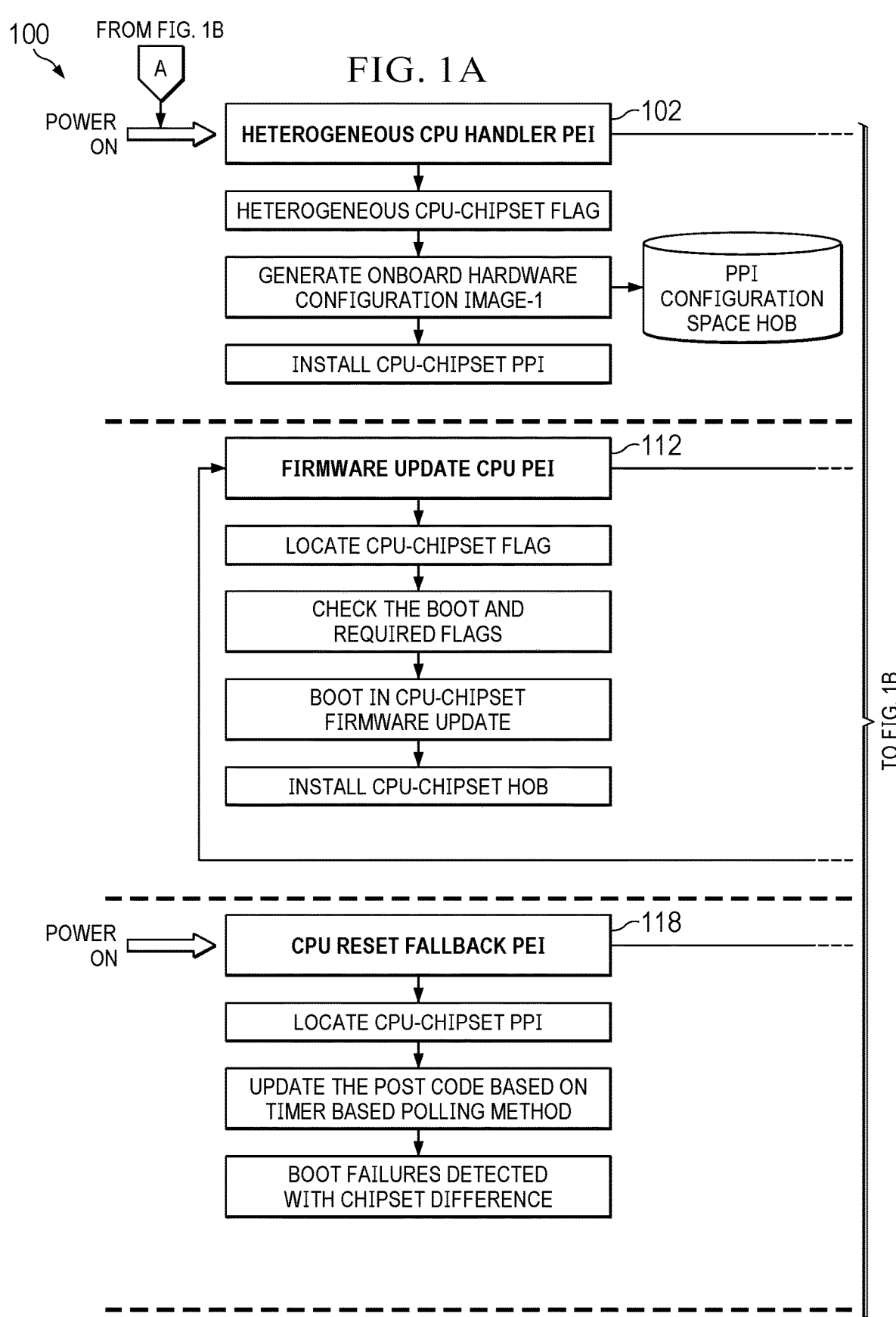

In the description that follows, like parts are marked throughout the specification and drawings with the same reference numerals. The drawing figures may be to scale and certain components can be shown in generalized or schematic form and identified by commercial designations in the interest of clarity and conciseness.

Chipset silicon original equipment manufacturers (OEMs) such as Intel and AMD often derive the different CPU families from a same chipset to provide better performance and efficiency. For example, the Intel Raptor Lake processor is a derivative of the Intel Alder Lake (ADL) processor family and fits into the ADL chipset. Similarly, Intel's Whiskey Lake (WHL), Cannon Lake (CNL), Comet Lake (CML) and Rocket Lake (RKL) carry common chipsets but different processors and corresponding code bases (such as uCode, security updates, ACM and so forth). The processor families for AMD such as the AM4 B540 Chipset can support Ryzen as well Athlon CPU families. When the same chipset drivers are used to extend support to different processor family operations, incompatible security updates can create serious issues in sustaining life cycle of a platform.

When different processing platforms maintain different processors and chipset code from different silicon vendors, it is necessary to ensure that processor-based releases from chipset vendors are distributed properly, which can be different from the way in which a change in core technology can cause the same processor to get updated with different attributes or configurations.

For example, the Intel WHL processor is derived from the CNL chipset and the RKL processor is derived from CML chipset, but the vendor core updates will be released to a specific processor or chipset for RKL. The handling of code updates can thus be very difficult for these chipset platforms.

Silicon vendors can only provide security/CPU-uCode updates for latest CPU family after a design has been released. The older version of the processors will also need compatible updates if there are any gaps in the platform versions used by an enterprise. This condition can pose a severe problem for an enterprise if they are unable to implement a seamless update for CPU security vulnerabilities.

The present disclosure recognizes that there is currently no capability for updates to uCode, to address security vulnerabilities, for third party vendor code or other code, to provide a seamless operation across an enterprise for updates to all processors. The present disclosure thus provides a hardware abstraction provisioning protocol.

When an enterprise user has identified bugs or intrusion protection system issues, they typically need to be individually remediated based on the chipset and CPU combination of the processors used at the enterprise. An update for the same or similar issue may be available for the latest CPU family, but might not be able to be applied to older CPUs.

For example, intrusion protection system issues can involve the wrong uCode being updated on a particular CPU with a wrong chipset driver, resulting in the platform becoming inoperative. In this case, there may have been no CPU initialization and it may be necessary to replace the CPU to resolve the problem.

Likewise, incompatible CPU updates over a common chipset may take multiple reboot cycles to resolve. In many cases, the update ultimately fails and leaves system in non-bootable state.

Silicon vendors such as Intel and AMD often provide updates in a sequential manner for chipset-to-CPU code. If there is a gap in any updates, missing updates that the gap introduces can become a severe problem to customers. This problem is due in part to the silicon vendor not recognizing the problem, and is an industry-wide problem that can be addressed by the seamless provisioning protocol of the present disclosure.

For a system on a chip (SoC), agnostic firmware updates that are issued often do not include platform customization that doesn't match previous attributes or properties of the SoC. An SoC configuration mismatch can result in platform operational failure. The present disclosure provides a generic solution to intelligently decouple the CPU to chipset derivation code and reapply the new release from silicon vendor based on latest release with respect to the platform CPU properties and the platform attributes in firmware updates.

The present disclosure thus enables seamless security updates for the CPU and chipset, to support deployed platforms. The present disclosure also provides for hardware abstracted provisioning for chipset-to-CPU updates across various silicon vendors. With a single reboot, CPU-to-chipset drivers can be updated without system hang-up, to provide improved update success rates.

An intelligent, heterogeneous chipset-to-CPU provision hardware level protocol is disclosed that provides for handling common chipset drivers. The protocol can be used to provision different CPU families across multiple silicon vendors. Trust-signature verified uCode and chipset driver updates are performed as a function of CPU IDs that are mapped to a particular chipset, to ensure that no wrong updates are installed that can cause misoperation of the chipset internal integrated circuits.

A heterogeneous method to intelligently decouple CPU-to-chipset derivation code is also provided, for dynamic provisioning and to load and boot uCode, memory initialization drivers, chipset initialization drivers and various other hardware configurations. The method of the present disclosure implements an interface to handle common chipset drivers, to support different CPU families across multiple silicon chipset vendors. The present disclosure provides an interface to handle a platform boot with a heterogeneous chipset-to-CPU family. The present disclosure also implements a solution to create a binary image for a hardware configuration and stores the image into static basic input-output system (BIOS) firmware. This static BIOS hardware configuration can be used by a flash memory update and other utilities to extract and control the platform firmware updates that will be implemented with the boot mode.

The configuration images can be saved into an extensible firmware interface (EFI) system partition or other suitable software structures, such as in the same manner that recovery images are created or in other suitable manners. The configuration images can be used in a fallback remediation module to roll-back the platform to earlier versions.

The present disclosure also provides a CPU-to-CPU silicon bridge protocol to implement a method to publish intelligent provisioning for a physical presence interface (PPI) protocol, such as for mapping higher generation CPUs to a lower generation CPU silicon code. The present disclosure can be used to implement pre-EFI initialization (PEI) and driver execution environment (DXE) modules, to install the PPI and protocol services for PEI and DXE phase modules. In this manner, a CPU to silicon bridge protocol can be implemented for loading different firmware drivers for memory initialization, chipset initialization and platform hardware configuration. The PPI protocol provides different services to get a configuration database for a chipset driver to support different CPU family across multiple silicon chipsets.

A method to handle seamless updates across different CPUs is disclosed that implements a solution to handle BIOS recovery, software updates, reference code updates with different chipset-to-CPU architecture and other suitable code. The present disclosure locates the CPU-to-chipset protocol in a firmware update boot path and verifies the onboard image configuration and build time static binary. A configuration difference and risk level for a firmware update can be generated, and verification for platform default value changes and detection of platform failure levels can also be provided.

A CPU reset-based fallback method for a CPU remediation module is also provided. A dynamic method can be used to detect the platform boot state using runtime probes, with verification to a static chipset platform configuration database. A remediation fallback method is used to handle platform failover methods with CPU reset, where a cold boot is only needed if complex programmable logic device (CPLD) or chipset drivers are updated. The remediation fallback method can be used to locate a CPU-to-chipset protocol in a firmware recovery boot path. Based on boot verification failures, the remediation fallback method can load a previous firmware configuration and update a rollback to a previous CPU-to-chipset configuration. A trust-signature verified uCode and chipset driver update can be performed on a CPU ID that is mapped to a particular chipset to ensure that no wrong updates are installed, which could cause chipset internal integrated circuits to misoperate.

The present disclosure can be used to define a set of flags and a boot mode configuration to handle a platform boot for heterogeneous mode with full configuration, update and recovery modes. A platform pre-boot flow can be controlled by the boot modes. When the flags for heterogeneous mode are enabled, the present disclosure builds a platform configuration with full configuration mode, firmware update and recovery boot modes, and passes the configuration information to later UEFI stages.

The present disclosure can be used to implement a solution to create a binary image for hardware configuration and to store the image into static BIOS firmware. The static BIOS hardware configuration can be used by a flash update and other utilities to extract and decide the platform firmware updates with boot mode.

FIGS. 1A through 1C are a diagram of a system 100 for seamless update provisioning for common chipsets carrying different CPU families, in accordance with an example embodiment of the present disclosure. System 100 includes heterogeneous CPU handler PEI 102, heterogeneous CPU handler system management mode (SMM) 104, heterogeneous CPU handler SMM runtime 106, firmware update 108, firmware update CPU DXE 110, firmware update CPU PEI 112, CPU reset fallback PEI 118, CPU reset fallback DXE 116 and CPU reset fallback SMM 114, each of which can be implemented in hardware or a suitable combination of hardware and software.

Heterogeneous CPU handler PEI 102 can be implemented as one or more processors with associated data memory devices that store one or more algorithms that cause the one or more processors to receive a power on command and to implement an heterogeneous CPU-chipset flag, to generate an onboard hardware configuration image-1 using a PPI configuration space hierarchical operation binding (HOB), to install a CPU-chipset PPI and to perform other processes and functions as disclosed and described herein. Heterogeneous CPU handler PEI 102 is coupled to heterogeneous CPU handler SMM 104 and is configured to provide data to heterogeneous CPU handler SMM 104, as disclosed and described herein.

Heterogeneous CPU handler SMM 104 can be implemented as one or more processors with associated data memory devices that store one or more algorithms that cause the one or more processors to locate the HOB passed from PEI drivers, to update the CPU-chipset DXE drivers' configuration using a DXE/runtime configuration space HOB, to install the CPU-chipset protocol globally-unique identifier (GUID) and to perform other processes and functions as disclosed and described herein. Heterogeneous CPU handler SMM 104 is coupled to heterogeneous CPU handler SMM runtime 106 and is configured to provide data to heterogeneous CPU handler SMM runtime 106, as disclosed and described herein.

Heterogeneous CPU handler SMM runtime 106 can be implemented as one or more processors with associated data memory devices that store one or more algorithms that cause the one or more processors to locate a protocol GUID, to update override ACFI methods and runtime configurations, to install CPU-chipset methods and to perform other processes and functions as disclosed and described herein.

Firmware update 108 can be implemented as one or more processors with associated data memory devices that store one or more algorithms that cause the one or more processors to receive a start command and in response to extract and authenticate BIOS firmware images, extract and authenticate onboard human-computer interaction (HCI) images, verify the platform configuration headers, verify HCI and new updated firmware images, validate platform CPU-chipset default settings and to perform other processes and functions as disclosed and described herein. Firmware update 108 is coupled to firmware update CPU PEI 112 and is configured to provide data to firmware update CPU PEI 112, as disclosed and described herein.

Firmware update CPU DXE 110 can be implemented as one or more processors with associated data memory devices that store one or more algorithms that cause the one or more processors to locate HOB passed from PEI drivers, update the CPU-chipset DXE drivers' configuration, install the CPU-chipset protocol GUID, authenticate and onboard a new updated firmware configuration, implement a firmware update, perform a reset start-up test, boot in regular mode, to implement a power on and to perform other processes and functions as disclosed and described herein. Firmware update CPU DXE 110 is coupled to firmware update 108 and is configured to provide data to firmware update 108, as disclosed and described herein.

Firmware update CPU PEI 112 can be implemented as one or more processors with associated data memory devices that store one or more algorithms that cause the one or more processors to locate CPU-chipset flag, check the boot and required flags, boot in CPU-chipset firmware update, install a CPU-chipset HOB and to perform other processes and functions as disclosed and described herein. Firmware update CPU PEI 112 is coupled to firmware update CPU DXE 110 and is configured to provide data to firmware update CPU DXE 110, as disclosed and described herein.

CPU reset fallback PEI 118 can be implemented as one or more processors with associated data memory devices that store one or more algorithms that cause the one or more processors to receive a power on command and to locate CPU-chipset PPI, update the post code based on timer based polling method, identify boot failures detected with chipset difference and to perform other processes and functions as disclosed and described herein. CPU reset fallback PEI 118 is coupled to CPU reset fallback DXE 116 and is configured to provide data to CPU reset fallback DXE 116, as disclosed and described herein.

CPU reset fallback DXE 116 can be implemented as one or more processors with associated data memory devices that store one or more algorithms that cause the one or more processors to implement a CPU-chipset PPI/protocol, locate onboard backup images, extract and verify the images, update the CPU policy with a previous configuration, update the CPU policy with a hardware configuration, boot with update policy configuration, implement a power on at heterogeneous CPU handler PE 102 and to perform other suitable processes as disclosed and described herein. CPU reset fallback DXE 116 is coupled to CPU reset fallback SMM 114 and is configured to provide data to CPU reset fallback SMM 114, as disclosed and described herein.

CPU reset fallback SMM 114 can be implemented as one or more processors with associated data memory devices that store one or more algorithms that cause the one or more processors to perform one or more functions as disclosed and described in greater detail herein.

Figure 2:
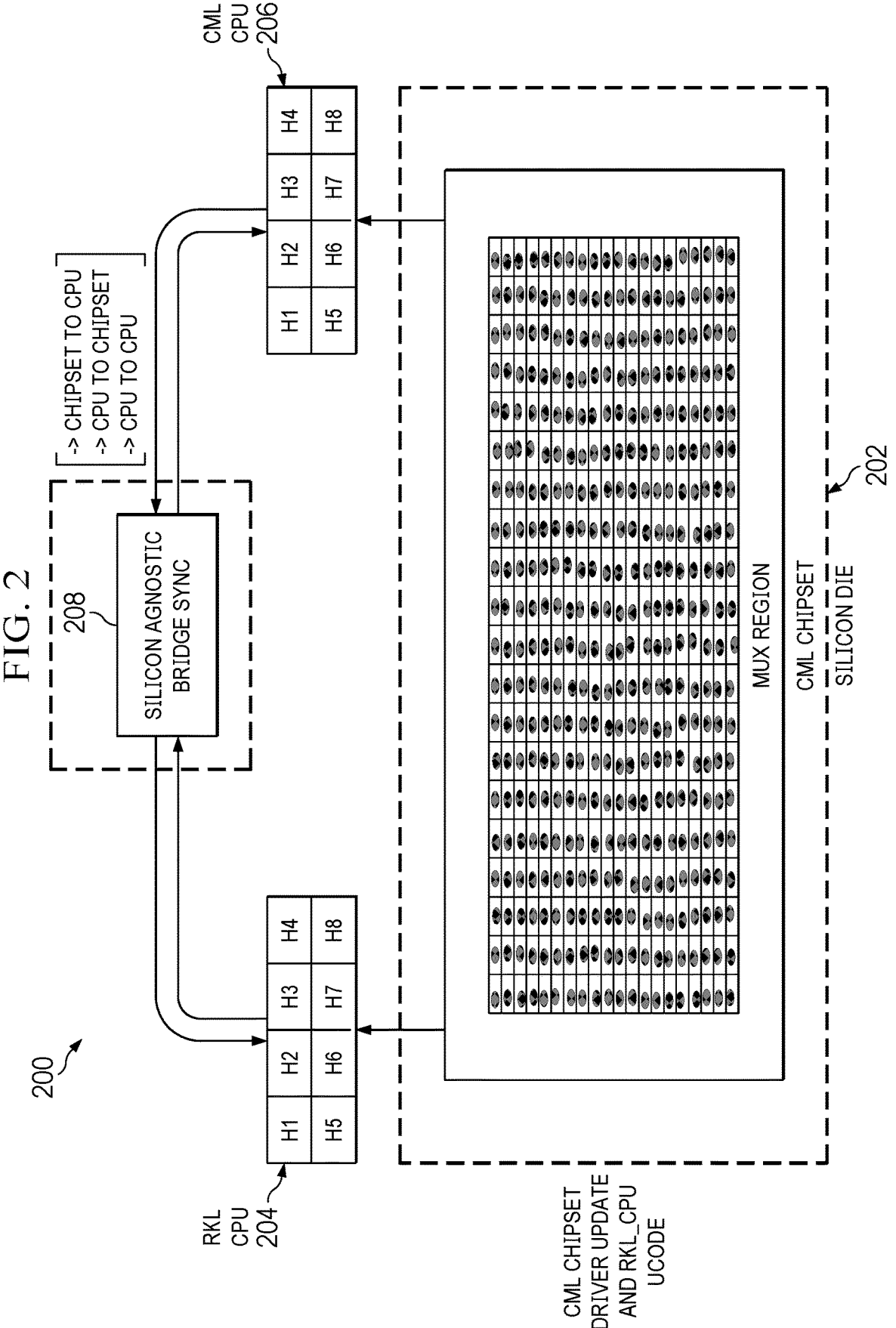
FIG. 2 is a diagram of an architecture for seamless update provisioning for common chipsets carrying different CPU families, in accordance with an example embodiment of the present disclosure.

FIG. 2 is a diagram 200 of an architecture for seamless update provisioning for common chipsets carrying different CPU families, in accordance with an example embodiment of the present disclosure. Diagram 200 includes silicon die 202, RKL CPU 204, CML CPU 206 and silicon agnostic bridge sync 208, each of which can be implemented in hardware or a suitable combination of hardware and software.

Silicon die 202 can be implemented in silicon or other suitable materials and includes a CML chipset or other suitable chipsets and a multiplex (MUX) region. As part of a process to perform a CML chipset driver update and RKL CPU uCode update, silicon die 202 interfaces with RKL CPU 204 and CML CPU 206, as discussed and described further herein.

RKL CPU 204 can be implemented in silicon or other suitable materials and includes subunits H1 through H8 that are specific to RKL CPU 204. RKL CPU 204 is coupled to silicon agnostic bridge sync 208 for chipset to CPU, CPU to chipset and CPU to CPU updates, as discussed and described further herein.

CML CPU 206 can be implemented in silicon or other suitable materials and includes subunits H1 through H8 that are specific to CML CPU 206. CML CPU 206 is coupled to silicon agnostic bridge sync 208 for chipset to CPU, CPU to chipset and CPU to CPU updates, as discussed and described further herein.

Silicon agnostic bridge sync 208 can be implemented in hardware or a suitable combination of hardware and software, and interfaces with RKL CPU 204 and CML CPU 206 for chipset to CPU, CPU to chipset and CPU to CPU updates, as discussed and described further herein.

Figure 3:
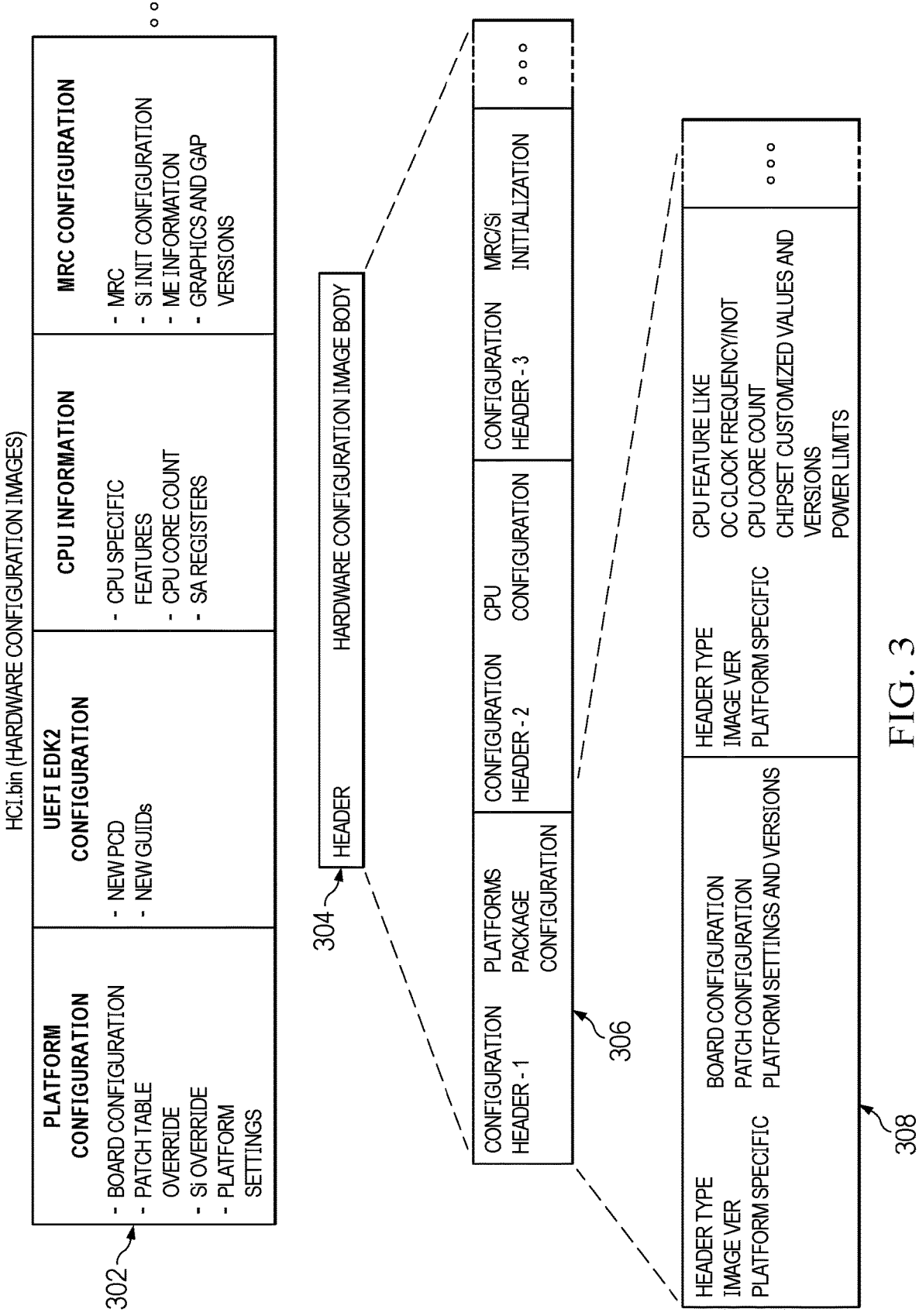
FIG. 3 is a diagram of a workflow for seamless update provisioning for common chipsets carrying different CPU families, in accordance with an example embodiment of the present disclosure.

FIG. 3 is a diagram 300 of a workflow for seamless update provisioning for common chipsets carrying different CPU families, in accordance with an example embodiment of the present disclosure. Diagram 300 includes HCI.bin hardware configuration images 302, header 304, configuration headers 306 and configuration header detail 308, as discussed and described in greater detail herein.

HCI.bin hardware configuration images 302 can be implemented in hardware or a suitable combination of hardware and software, and includes platform configuration data such as board configuration, patch table override, silicon override, platform settings and other suitable data. UEFI EDK2 configuration data can include a new platform configuration database (PCD), a new GUID and other suitable data. CPU information can include CPU specific features, CPU core count, system abstraction (SA) registers and other suitable data. Memory reference code (MRC) configuration can include the MRC, silicon initial configuration data, ME information, graphics and graphics processor (GAP) versions and other suitable data.

Header 304 can be implemented in hardware or a suitable combination of hardware and software, and includes a hardware configuration image body as described further herein.

Configuration headers 306 can be implemented in hardware or a suitable combination of hardware and software, and include configuration headers for platforms package configuration, CPU configuration, MRC/silicon initialization and other suitable data as described further herein.

Configuration header detail 308 can be implemented in hardware or a suitable combination of hardware and software, and includes header type data, image version data and platform specific data, such as 1) board configuration, patch configuration and platform settings and version, 2) CPU features like clock frequency, chipset customized values and versions and power limits and other suitable data.

Figure 4:
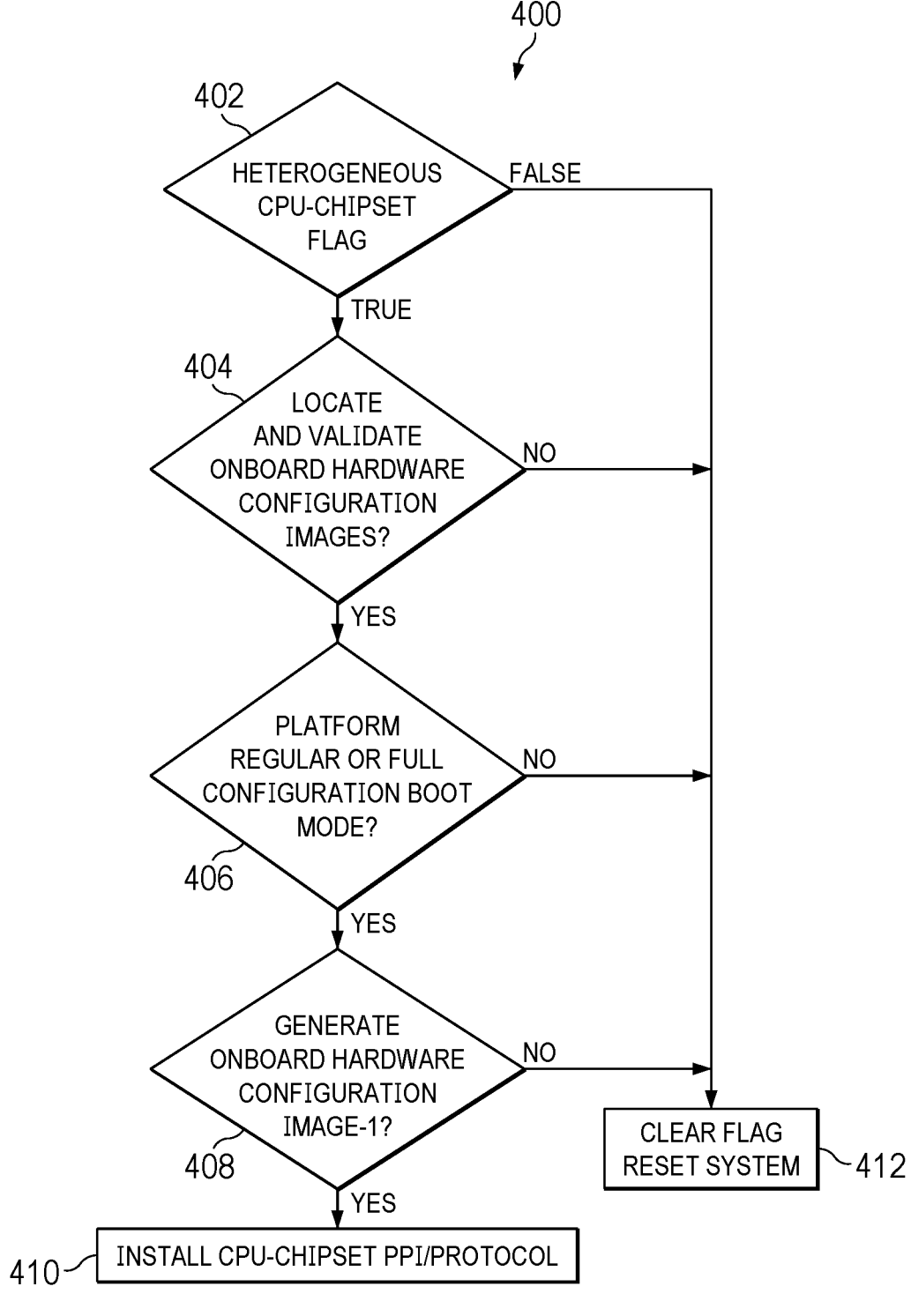
FIG. 4 is a diagram of a CPU-to-CPU silicon bridge protocol for seamless update provisioning for common chipsets carrying different CPU families, in accordance with an example embodiment of the present disclosure.

FIG. 4 is a diagram of an algorithm 400 for a CPU-to-CPU silicon bridge protocol for seamless update provisioning for common chipsets carrying different CPU families, in accordance with an example embodiment of the present disclosure. Algorithm 400 can be implemented in hardware or a suitable combination of hardware and software.

Algorithm 400 begins at 402, where a heterogeneous CPU-chipset flag is checked. If the flag is true, the algorithm proceeds to 404. If the flag is false, the algorithm proceeds to 412.

At 404, one or more onboard hardware configuration images are located and validated. If the images are located and validated, then the algorithm proceeds to 406, otherwise the algorithm proceeds to 412.

At 406, it is determined whether the platform is in a regular or full configuration boot mode. If so, then the algorithm proceeds to 408, otherwise the algorithm proceeds to 412.

At 408, it is determined whether an onboard hardware configuration image-1 is generated. If yes, then the algorithm proceeds to 410, otherwise the algorithm proceeds to 412.

At 410, a CPU-chipset PPI/protocol is installed, as disclosed and described in further detail herein.

At 412, the heterogeneous CPU-chipset flag is cleared and the system is reset, as disclosed and described in further detail herein.

In operation, algorithm 400 provides for a CPU-to-CPU silicon bridge protocol for seamless update provisioning for common chipsets carrying different CPU families. While algorithm 400 is shown as a flow chart, a person of skill in the art will recognize that it can also or alternatively be implemented using object oriented programming, state diagrams, ladder diagrams, other suitable programming paradigms or a suitable combination of programming paradigms.

Figure 5:
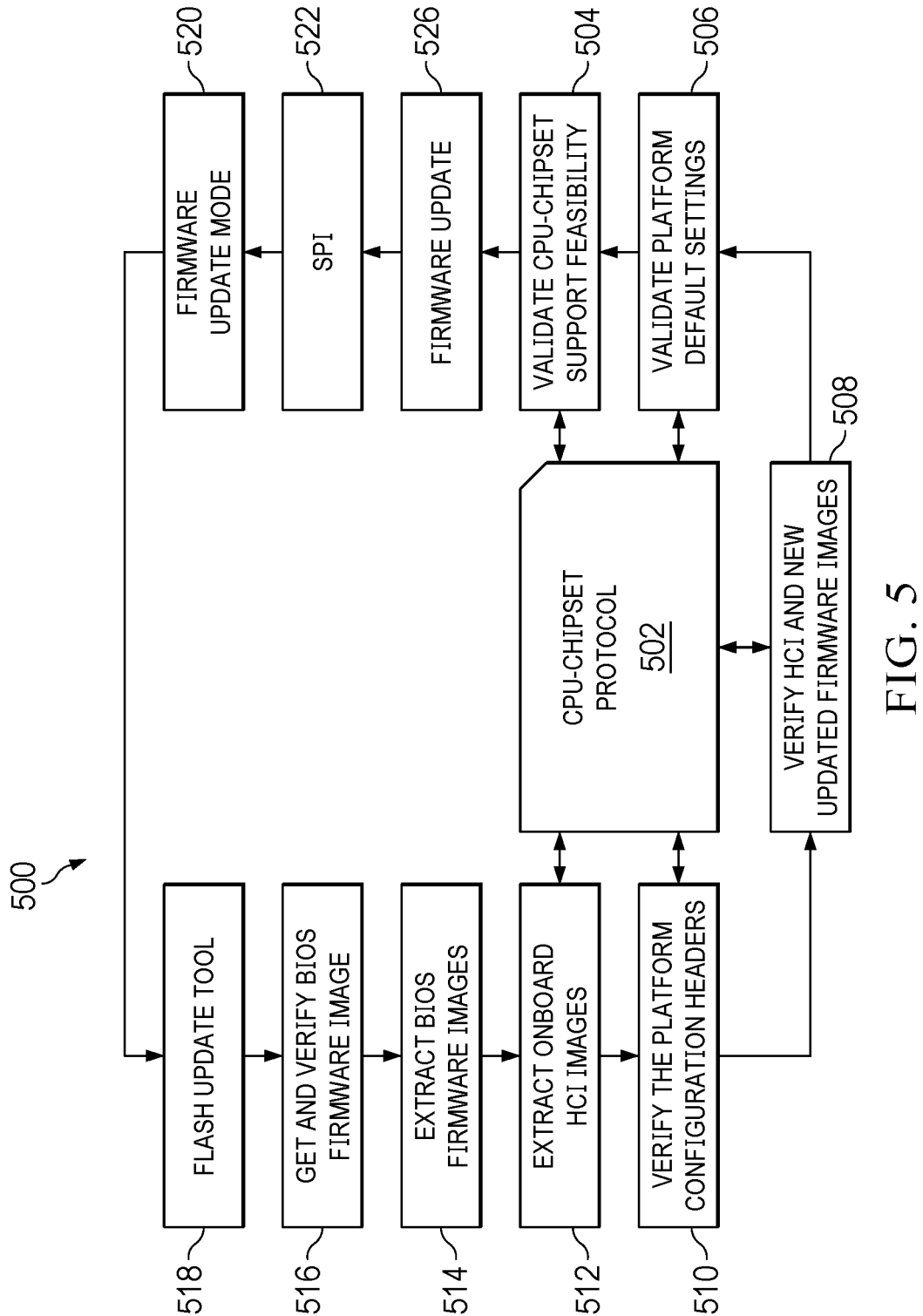
FIG. 5 is a diagram of a workflow for seamless update across different CPUs, in accordance with an example embodiment of the present disclosure.

FIG. 5 is a diagram 500 of a workflow for seamless update across different CPUs, in accordance with an example embodiment of the present disclosure. Diagram 500 includes CPU-chipset protocol 502, which initiates the workflow and interfaces with validate CPU-chipset support feasibility 504, validate platform default settings 506, verify HCI and new updated firmware images 508, verify the platform configuration headers 510 and extract onboard HCI images 512.

Firmware update 526 receives data from validate CPU-chipset support feasibility 504 and provides data to SPI 522, as disclosed and described in further detail herein.

SPI 522 receives the data from firmware update 526 and provides data to firmware update model 520, as disclosed and described in further detail herein.

Firmware update model 520 receives data from PI 522 and provides data to flash update tool 518, as disclosed and described in further detail herein.

Flash update tool 518 receives data from firmware update mode 520 and provides data to get and verify BIOS firmware image 516, as disclosed and described in further detail herein.

FIG. 6 is a diagram of an algorithm 600 for CPU reset based fallback, in accordance with an example embodiment of the present disclosure. Algorithm 600 can be implemented in hardware or a suitable combination of hardware and software.

Algorithm 600 begins at 602, where locate CPU-chipset PPI, as disclosed and described in further detail herein. The algorithm then proceeds to 604.

At 604, update the post code based on timer based polling method, as disclosed and described in further detail herein. The algorithm then proceeds to 606.

At 606, boot failures detected with chipset difference, as disclosed and described in further detail herein. The algorithm then proceeds to 608.

At 608, CPU-chipset PPI protocol, as disclosed and described in further detail herein. The algorithm then proceeds to 610.

At 610, locate HCI onboard backup images, as disclosed and described in further detail herein. The algorithm then proceeds to 612.

At 612, extract and verify images, as disclosed and described in further detail herein. The algorithm then proceeds to 614.

At 614, update the CPU policy with previous configuration and perform CPU reset, as disclosed and described in further detail herein. The algorithm then proceeds to 616.

At 616, update CPU policy with hardware configuration, as disclosed and described in further detail herein. The algorithm then proceeds to 618.

At 618, boot with updated policy configuration, as disclosed and described in further detail herein.

In operation, algorithm 600 provides for CPU reset based fallback. While algorithm 600 is shown as a flow chart, a person of skill in the art will recognize that it can also or alternatively be implemented using object oriented programming, state diagrams, ladder diagrams, other suitable programming paradigms or a suitable combination of programming paradigms.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for network management comprising:

a plurality of silicon data processing devices;

a silicon management system operating on a processor that causes the processor to load one or more algorithms stored in a non-transient data memory to cause the processor to identify a version for the plurality of silicon data processing devices, wherein the silicon data processing devices are CPUs, using a CPU chipset protocol globally unique identifier (GUID) for each silicon data processing device;

a chipset management system operating on a processor that causes the processor to load one or more algorithms stored in a non-transient data memory to cause the processor to identify a version for a plurality of chipsets, each chipset associated with one of the silicon data processing devices and having a plurality of associated drivers, using a physical presence interface (PPI) protocol;

the chipset management system further causing the processor to use the PPI to map a higher generation silicon data processing device identifier to the drivers of a lower generation chipset and to implement an update to each of the drivers of one or more of the chipsets based on the mapping;

the silicon management system further causing the processor to implement an update to one or more of the silicon data processing devices using the GUID for the silicon data processing device and the mapping; and a boot system configured to cause a system associated with the updated silicon data processing devices and the updated chipsets to reboot.

2. The system of claim 1 wherein the silicon management system is configured to identify a version for a processor as a function of a CPU ID that is mapped to the silicon data processing device identifier and to implement an update to the processor.

3. The system of claim 1 wherein the silicon management system is configured to identify a version for a central processing unit as a function of a CPU ID and the silicon data processing device identifier and to implement an update to the central processing unit.

4. The system of claim 1 wherein the silicon management system is configured to identify a version for firmware using a map of higher generation CPUs to lower generation CPU silicon code that identifies the silicon data processing device identifier as being one of the higher generation CPUs and to implement an update to the firmware using the lower generation CPU silicon code.

5. The system of claim 1 wherein the silicon management system is configured to identify a version for firmware for a processor using the silicon data processing device identifier and a PPI protocol map that maps higher generation CPUs to lower generation CPU silicon code and to implement an update to the firmware for the processor.

6. The system of claim 1 wherein the silicon management system is configured to identify a version for firmware for a central processing unit using a CPU chipset protocol globally unique identifier and to implement an update to the firmware for the central processing unit.

7. The system of claim 1 wherein the silicon management system is configured to identify a version for a driver execution environment and to implement an update to the driver execution environment.

8. The system of claim 1 wherein the silicon management system is configured to identify a version for a fallback driver execution environment and to implement an update to the fallback driver execution environment.

9. The system of claim 1 wherein the boot system is configured to reboot with an updated fallback driver execution environment.

10. The system of claim 1 wherein the boot system is configured to reboot with updated firmware for a processor.

11. A method for network management comprising:

loading one or more algorithms stored in a non-transient data memory using a silicon management system operating on a processor;

identifying, by the silicon management system operating on the processor, a version for a plurality of silicon data processing devices, wherein the silicon data processing devices are CPUs, using a CPU chipset protocol globally unique identifier (GUID) for each silicon data processing device;

loading one or more algorithms stored in a non-transient data memory using a chipset management system operating on a processor;

identifying, by the chipset management system operating on the processor, a version for a plurality of chipsets, each chipset associated with one of the silicon data processing devices, using a physical presence interface (PPI) protocol;

using, by the chipset management system operating on the processor, the PPI to map a higher generation silicon data processing device to a lower generation chipset and to implement an update to drivers of the one or more of the chipsets based on the mapping;

implementing, by the silicon management system operating on the processor, an update to one or more of the silicon data processing devices using the GUID for the silicon data processing device and the mapping;

rebooting a system associated with the updated silicon data processing devices and the updated chipsets.

12. The method of claim 11 wherein the silicon management system is configured to identify a version for a processor using the GUID and to implement an update to the processor.

13. The method of claim 11 wherein the silicon management system is configured to identify a version for a central processing unit using the GUID and to implement an update to the central processing unit.

14. The method of claim 11 wherein the silicon management system is configured to identify a version for firmware using a PPI configuration space hierarchical operation binding and to implement an update to the firmware.

15. The method of claim 11 wherein the silicon management system is configured to identify a version for firmware for a processor using a PPI GUID map and to implement an update to the firmware for the processor.

16. The method of claim 11 wherein the silicon management system is configured to identify a version for firmware for a central processing unit and to implement an update to the firmware for the central processing unit.

17. The method of claim 11 wherein the silicon management system is configured to identify a version for a driver execution environment and to implement an update to the driver execution environment.

18. The method of claim 11 wherein the silicon management system is configured to identify a version for a fallback driver execution environment and to implement an update to the fallback driver execution environment.

19. The method of claim 11 wherein a boot system is configured to reboot with an updated fallback driver execution environment using a PPI map.

20. The method of claim 11 wherein a boot system is configured to reboot with updated firmware for a processor using a GUID.

* * * * *